April 6, 1954  W. R. PETERSON  2,674,463
REVERSIBLE CASTERING WHEEL STRUCTURE
Filed March 4, 1952  4 Sheets-Sheet 1

Inventor:
Walter R. Peterson
Paul O. Pippel
Atty.

April 6, 1954 W. R. PETERSON 2,674,463
REVERSIBLE CASTERING WHEEL STRUCTURE
Filed March 4, 1952 4 Sheets-Sheet 2

Inventor:
Walter R. Peterson
Paul O. Pippel
Atty.

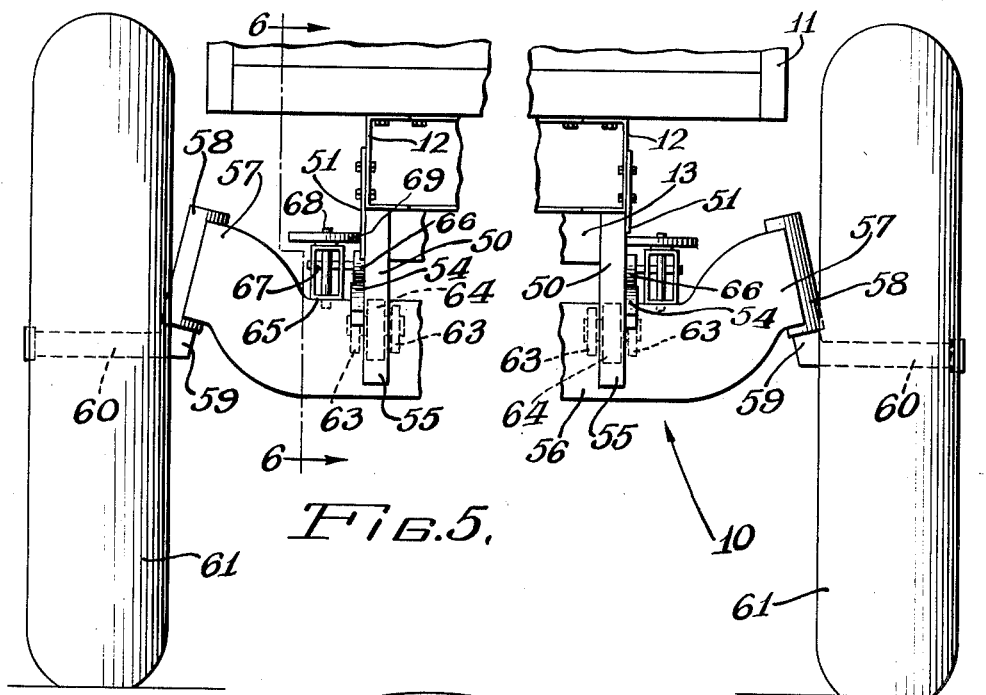

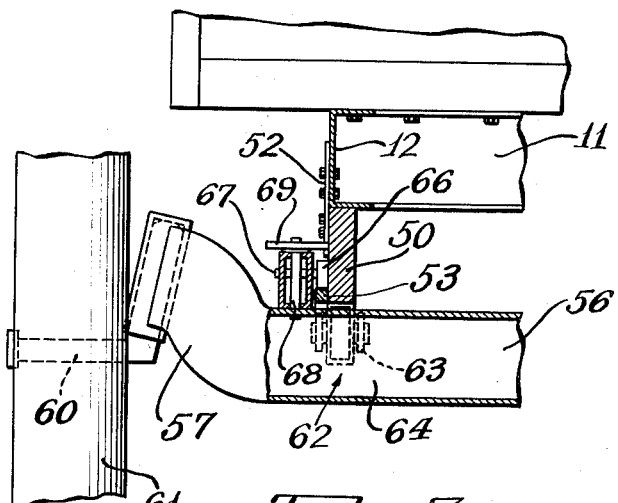
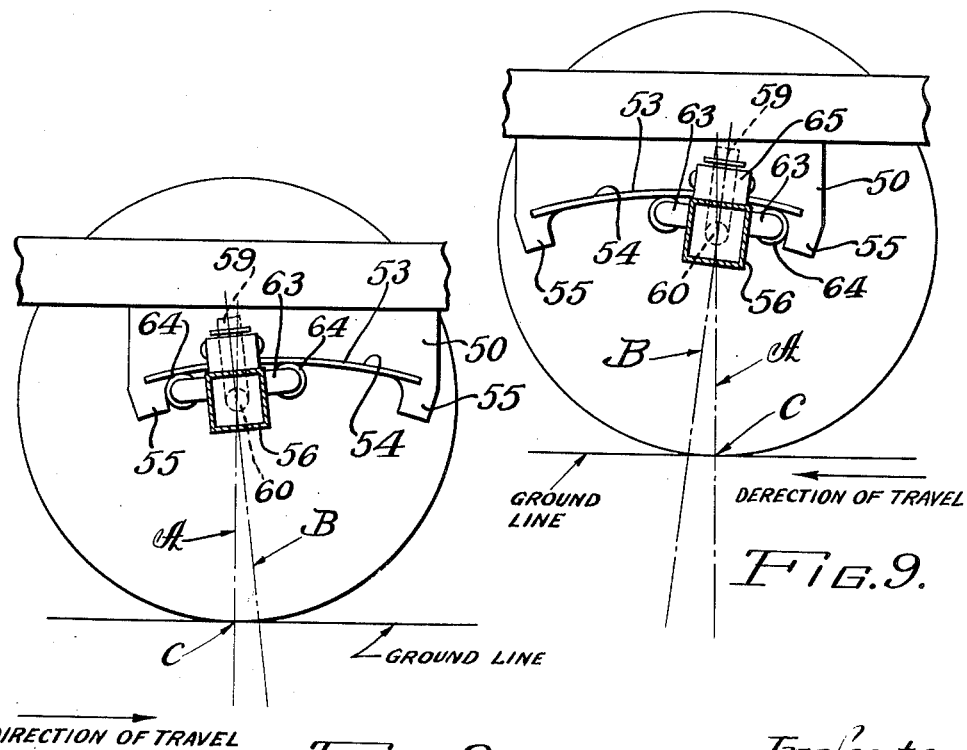

Patented Apr. 6, 1954

2,674,463

UNITED STATES PATENT OFFICE 2,674,463

REVERSIBLE CASTERING WHEEL STRUCTURE

Walter R. Peterson, Plainfield, Ill., assignor to International Harvester Company, a corporation of New Jersey Application March 4, 1952, Serial No. 274,797

13 Claims. (Cl. 280—80)

This invention relates to a castering wheel structure for vehicles. More specifically this invention relates to an improved castering wheel mechanism having a power reversing mechanism operative during reversals in the direction of movement of a wheeled vehicle.

In applicant's patent application, Serial No. 221,689, entitled "Reversible Castering Wheel Structure," filed April 18, 1951, an improved castering wheel structure is disclosed. As indicated in this application, in a conventional castering wheel structure the ground wheel is usually journalled on a spindle which has a vertical portion turning about a vertical axis in a socket which is rigidly supported on the vehicle. The socket normally is set forwardly of the bearing or contact point of the wheel with the ground. Thus a vertical centerline through the socket intersects the ground ahead of the contact point of the wheel, this contact point of the wheel with the ground also being conventionally referred to as the center of rolling resistance. The point of rolling resistance, thus, in a conventional construction, is rearwardly (with respect to direction of movement) of a vertical centerline through the spindle and socket. This construction results in a castering or tracking of the wheel. In other words, the wheel follows in the direction of movement of the vehicle in a manner which is well known to those familiar with castering wheel assemblies. The castering facility is greatly desirable in many vehicle constructions and is especially useful in connection with farm implements and trailing mechanisms such as tractor trailers.

The foremost objection to a castering wheel construction is that the wheel will caster freely in one direction but upon a sudden reversal in the direction of movement difficulties will occur that to a great extent limit the usefulness of such a wheel. In order for a castering wheel to function properly on a sudden reversal of direction, the spindle will have to turn 180 degrees within its socket so that the vertical centerline of the socket is ahead of the point of rolling resistance of the wheel upon this reversal of direction. In other words, the structural conditions which readily permit a wheel to caster in one direction will have to be reversed completely if it is desired to move the castering wheel in a reversed direction. Thus, the problem of quickly reversing a castering wheel structure is of prime importance. Due to uneven ground conditions the castering wheel may be subjected to lateral thrusts or forces that will cause the wheel to drag along the ground during turning of the spindle and thus the normal advantages of a castering structure may be completely eliminated. Thus, if a driver of the vehicle suddenly decides to reverse the vehicle's direction the castering wheels would have a tendency to drag and the center of rolling resistance could not be shifted quickly enough with respect to the vertical axis of the spindle in order to effect a prompt and efficient castering action. The advantages of a conventional castering wheel structure are lost therefore where the vehicle is subject to quick reversals of direction.

It is a prime object of this invention, therefore, to provide an improved castering assembly for vehicles, the assembly including a structure which is automatically operable during changes in the direction of movement of the vehicle for changing the castering geometry of a castering wheel structure so that castering benefits are obtained when the vehicle is moving in either direction.

A more specific object is to provide a castering wheel structure for vehicles, the structure including an axle to which the vertical spindle of a castering wheel is connected, the axle being shiftable or tiltable about a horizontal axis whereby a vertical centerline through the spindle may be shifted to opposite sides of the contact point of the wheel with the ground or the point of rolling resistance.

Still another object of this invention is to provide a castering wheel structure for vehicles, the structure including an axle which may be shifted longitudinally with respect to its supporting structure on the vehicle, the axle being tiltable about a horizontal axis during such longitudinal shifting movement whereby a castering spindle may be angularly tilted to effect castering action of the wheel which is attached to the stub shaft of the castering spindle.

Still, a more specific object is to provide a castering wheel structure including an axle shiftable longitudinally with respect to the body of a vehicle, the axle including a cam arm which is engageable with a camming surface on the body of the vehicle for tilting the axle about a horizontal axis whereby a castering spindle mounted on the axle may be shifted to a variety of angular positions in response to changes in the direction of movement of the vehicle.

A still further object is to provide a castering wheel axle including a supporting structure for connecting the axle to a vehicle body, the supporting structure including a longitudinally extending track and the axle having bearing members engaging the track in longitudinally sliding relation, the axle being tiltable during the longitudinal sliding movement to shift a castering spindle into various positions to accommodate changes in direction of movement of the vehicle.

A still further object is to provide an improved castering wheel structure for a vehicle, the castering geometry of the castering wheel structure being automatically changed during reversals in a direction of movement of the vehicle, the castering wheel structure including an axle which is longitudinally shiftable on an arcuate track which is connected to the body of the vehicle, the axle having a spindle connected thereto, the spindle being movable with the axle to a variety of angular positions so that a vertical centerline through the axis of the spindle intersects the ground line at a point spaced forwardly of the rolling resistance of the wheel during forward movement of the vehicle and whereby the vertical centerline intersects the ground at a point spaced rearwardly of the point of rolling resistance of the wheel when the spindle is shifted and the vehicle moves in a rearward direction.

These and further objects will become more readily apparent from a reading of the specification when taken in connection with the accompanying sheets of drawings.

In the drawings:

Figure 5 is a rear view in elevation of a vehicle showing a modified castering assembly;

Figure 6 is a sectional view through a modified castering assembly, the view being taken substantially along the line 6—6 of Figure 5;

Figure 7 is a cross-sectional view through a castering structure, the view being taken substantially along the line 7—7 of Figure 6;

Figure 8 is a schematic view of the castering wheel structure shown in Figures 5 through 7, the view showing one position of the castering wheel structure; and Figure 9 is a schematic view similar to Figure 8, this view showing a second operating position of a castering wheel structure.

Figure 1:
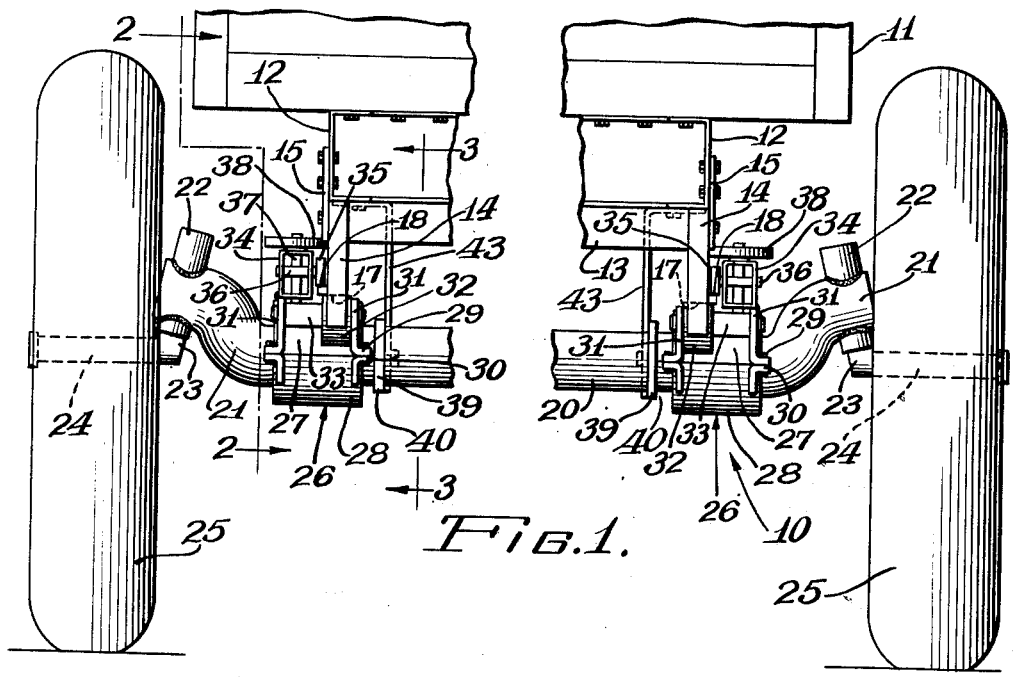
Figure 1 is a rear view in elevation of a vehicle having an improved castering wheel assembly, a central portion of the vehicle being omitted or broken away to better illustrate the invention.

Referring now particularly to Figures 1 through 4, a vehicle is generally designated by the reference character 10. The vehicle 10 includes a body 11 comprising a pair of laterally spaced and longitudinally extending channel members 12. The rearmost ends of the channel members 12 are connected by a transversely extending brace 13. A pair of transversely spaced track brackets 14 are connected to the longitudinally extending channel members 12 by means of rear plates 15 and forwardly positioned plates 16 which in turn are suitably fastened to the channel members 12.

Each track bracket 13 includes a longitudinally extending track 17, the track 17 having a laterally projecting edge portion 18 extending outwardly from the track bracket 14. Each track bracket 14 further includes longitudinally spaced stops 19.

An axle 20 extends transversely with respect to the vehicle body 11. The axle 20 includes oppositely disposed upwardly extending end portions 21. A castering spindle socket 22 is securely connected to each end portion 21. A castering spindle for each socket 22 includes a vertical journal or spindle portion 23 which is secured within the socket 22 for relative movement about a substantially vertical axis. Each journal portion 23 has a laterally extending journal portion or stub axle 24 integrally formed therewith. The caster wheel 25 is journalled on each stub axle 24.

A pair of laterally spaced roller assemblies 26 are mounted on the axle 20 each assembly being disposed immediately below one of the track brackets 14. Each roller assembly 26 includes a pair of complementary bearing collars 27 and 28 which encircle the axle 20. Flanges 29 and 30, respectively, on the complementary collars 27 and 28 are suitably connected together for maintaining the parts in assembly. Suitable bearings (not shown) may be provided in the complementary collars 27 and 28 so that the axle 20 may pivot freely about a horizontal axis within the collars 27 and 28.

Figure 2:
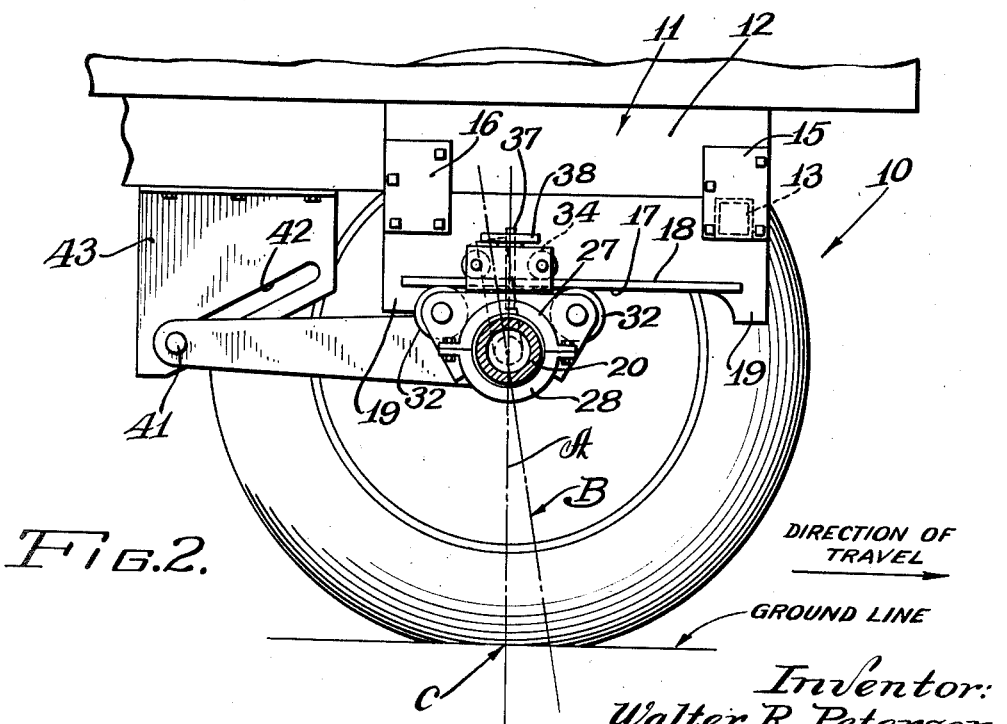
Figure 2 is a sectional view in elevation of a castering wheel assembly, the view being taken substantially along the line 2—2 of Figure 1.
Figure 3:
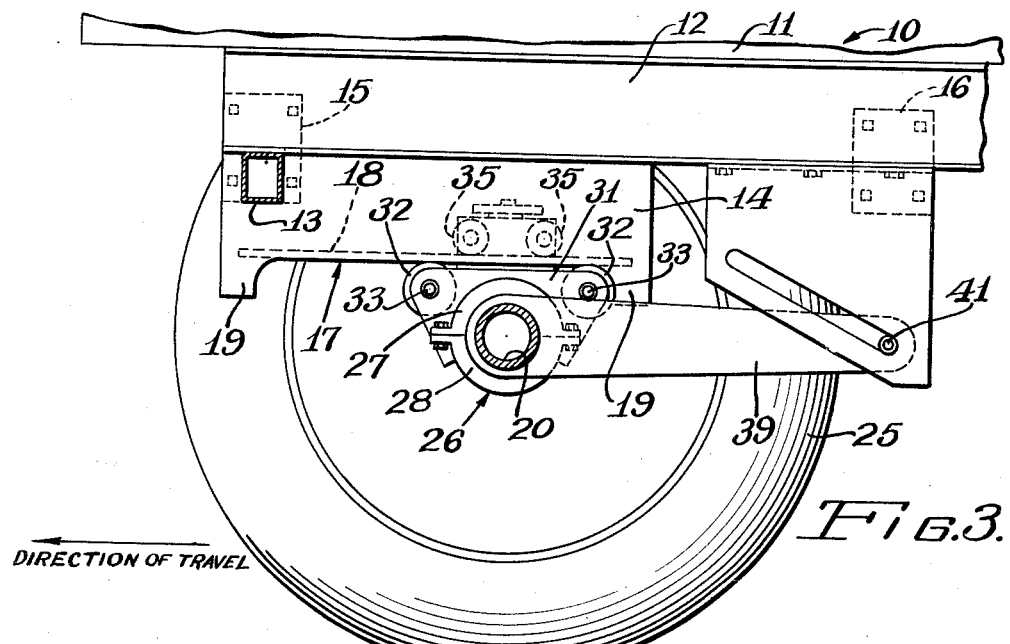
Figure 3 is a sectional view of a castering wheel assembly, the view being taken substantially along the line 3—3 of Figure 1.
Figure 4:
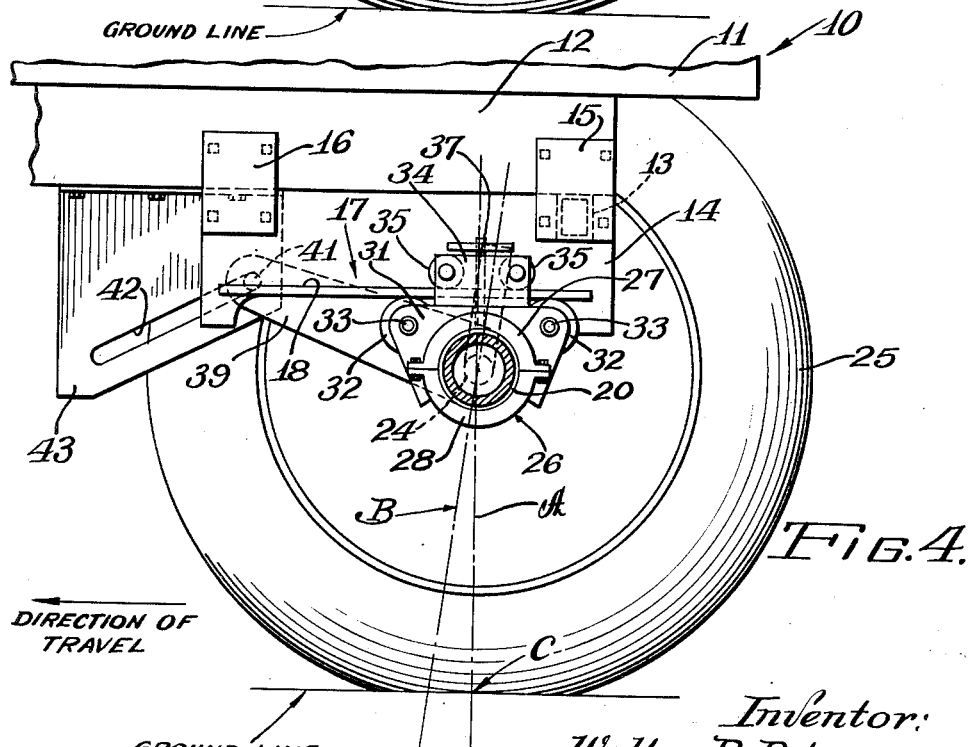
Figure 4 is a view similar to Figure 2 showing a castering wheel structure in operating position on a vehicle traveling in an opposite direction from the direction shown in Figure 2.

The collar 27 of each roller assembly 26 is provided with a pair of laterally spaced upwardly extending brackets 31. Longitudinally spaced rollers 32 are supported on shafts 33 which in turn are supported on the brackets 31. A box-shaped member 34 is suitably connected on the uppermost end of one of the brackets 31, each box-shaped member including a pair of longitudinally spaced rollers 35 which are suitably journalled on shafts 36, in turn supported on the box-shaped member 34. Each box-shaped member 34 further supports a vertically extending shaft 37 which at its upper end has journalled thereon a roller 38. The rollers 32 are in engagement with the underneath side of the track 17 and roll along this track, the movement being limited by the stops 19. The rollers 35, as best shown in Figures 1 and 2, engage the upper edges of the laterally projecting edge portion 18 of the track 17. Thus, the axle 20 and the roller assemblies 26 are held against relative vertical movement with respect to the body 11 though relative longitudinal sliding movement of the axle is easily effected. The roller 38, which is pivoted about a vertical axis on the shaft 37, is in rolling engagement with the side surface of the track bracket 14. The rollers 38 maintain lateral stability of the axle 20 with respect to the vehicle body 11. As indicated in Figure 1 the axle 20 is provided with laterally spaced lever or cam arms 39 which are rigidly connected to the axle 20 by means of a weld 40 or other fastening means. As shown in Figures 2, 3 and 4, each lever or cam arm 39 includes a guide pin or cam element 41. Each cam element 41 is in engagement with a cam slot 42 provided in cam plates 43 which are suitably connected to the body 11 at transversely spaced points as indicated in Figure 1.

As indicated previously each conventional caster wheel contains a spindle which is pivotally engaged within a socket. A vertical centerline through the spindle is disposed forwardly of the point of rolling resistance or bearing point of the wheel with the ground and thus the castering wheel tracks in a castering manner. Upon a reversal of direction of movement the conventional castering wheel must be swung a full 180 degrees so that a vertical centerline through the shifted spindle intersects the ground spaced rearwardly with respect to the point of rolling resistance when the vehicle is moved in a rearward direction. The terms "forwardly" and "rearwardly" are used in the sense of the normal forward and rearward movement of a vehicle. In the operation of the present caster wheel construction the geometry of the castering elements is suitably changed so that the full benefits of the castering action are obtained. However, in applicant's improved construction the wheel itself is not shifted as in the manner of conventional constructions but the axle is automatically tilted so that the spindle itself tilts in a desired direction during reversals in the direction of movement of the vehicle. Such an operation will now be described:

In Figure 4 the vehicle is shown travelling in what may be called a forward direction. As the vehicle moves in this forward direction the axle 20 by virtue of the roller assemblies 26 has shifted so that the rollers 32 are moved rearwardly on the track 17 to the rearmost position being limited by the stops 19. Thus the axle 20 has been shifted to its farthest rearmost position. As the axle 20 is thus moved rearwardly guide pin or cam means 41 also moves rearwardly in the cam slot 42. The cam slot 42 is inclined angularly with respect to the longitudinal plane of the body 11 and as the pin 41 rides in the slot 42 in an upward direction during the longitudinal rearward shifting movement of the axle 20, the arms are turned or moved upwardly thus in turn imparting a rotating movement to the axle 20 whereupon the axle is tilted about a horizontal axis to the position indicated in Figure 4. As the axle 20 is thus tilted the sockets 22 and spindle portions 23 are also tilted angularly. In this position a vertical centerline B intersects the ground line at a point spaced forwardly of the center of rolling resistance or the bearing point of the wheel with the ground, the said point being indicated by the character C. A represents a vertical centerline through the axle or stub shaft of the spindle. During this forward direction of travel, therefore, a vertical centerline through the upright spindle intersects the ground at a point spaced forwardly of the center of rolling resistance. This in effect is the steering geometry of the conventional castering wheel and thus the wheels 25 caster and move in the desired direction. In Figures 2 and 3 the vehicle has its direction of movement reversed and the vehicle is now travelling in a rearward direction. During this rearward movement the axle 20 shifts in the direction toward the front of the vehicle. The shifting movement of the axle 20 is again effected by the rolling action of the roller assemblies 26 and their connection with respect to the tracks 17. Thus, as indicated in these figures, the axle is shifted longitudinally forwardly to its extreme forward position. During this forward shifting movement of the axle 20 the pin or cam 41 slides from the upper end of the slot 42 downwardly to the lower end and this causes a twisting action of the axle 20 about a horizontal axis. The spindle and socket now also have been tilted and the vertical centerline B through the spindle and socket intersects the ground at a point spaced rearwardly from the center of rolling resistance C. Thus, during this rearward movement of the vehicle the castering geometry has been shifted to enable the wheels 25 to assume their full castering action. The longitudinal shifting of the axle and simultaneous tilting of the same about its horizontal axis is effected automatically and immediately upon any change in the direction of movement of the vehicle. Thus the full castering action of the wheels results without the need of completely swinging the wheels around as in the case of conventional castering constructions.

A modified embodiment of the invention is shown in Figures 5 through 9 inclusive. The vehicle in this case is of similar construction as the construction described above with the exception of the castering wheel assemblies. Thus similar reference characters have been applied to similar portions of the vehicle. As best shown in Figures 5 and 6 the vehicle is provided with a pair of transversely spaced track brackets 50 which are suitably connected to the channels 12 by means of plates 51 and 52. Each track bracket 50 includes a longitudinally extending arcuate track 53 having a laterally extending projecting track edge 54. Each arcuate track 53 is provided with longitudinally spaced stops 55.

An axle 56 extends transversely below the track brackets 50. The axle 56 includes upwardly extending end portions 57, each end portion 57 having a castering socket 58 rigidly connected thereto. The castering socket 58 extends substantially in an upright or vertical manner. A pair of laterally spaced castering spindles each include a journal portion 59 which is journalled within each socket 58. Each journal portion 59 includes a laterally extending journal portion or stub axle 60 on which a caster wheel 61 is journalled.

A pair of laterally spaced roller assemblies 62, as shown in Figure 5, are connected to the axle 56. Each roller assembly 62 includes laterally spaced ears 63 which project outwardly from opposite sides of the axle 56. Longitudinally spaced rollers 64 are journalled on the brackets 63, the rollers 64 being in engagement with the underneath side of the track 53. Each roller assembly 62 further includes a box bracket or section 65 which is rigidly secured to the upper edge of the axle 56. Each box section 65 supports longitudinally spaced rollers 66 which are journalled on shafts 67 supported on the box section 65. Each box section 65 further includes a vertically extending shaft 68 on which a roller 69 is journalled for rotation about a vertical axis. The rollers 66 engage the upper edge of the projecting portion 54 of the track 53 in rolling relation. The roller 69 is in rolling engagement with a side portion of each track bracket 50. The roller assemblies 62 are so constructed with respect to the track brackets 50 that the axle 56 is secured against lateral and vertical movement with respect to the body 11 of the vehicle.

The track 53 is of arcuate shape and thus longitudinal shifting movement of the axle 56 causes tilting movement of said axle.

The principle of operation of the castering wheel construction shown in this modification is similar to the principle of operation above discussed. In Figure 9, the vehicle is moving in a forward direction and the axle 56 has shifted to its rearwardmost point on the track 53. In this position the vertical centerline B through the spindle intersects the ground at a point spaced forwardly of the point of rolling resistance C. Thus the full castering action of the wheels is obtained.

When the vehicle moves in a reverse or rearward direction, as indicated in Figure 8, the axle immediately shifts longitudinally to its forwardmost position and in view of the arcuate track 53 the axle 56 is tilted in a manner wherein the vertical centerline B through the spindle intersects the ground at a point spaced rearwardly of the point of rolling resistance C. Thus, during this rearward movement of the vehicle the geometry of the castering structure has been changed simultaneously with such rearward movement to provide for proper castering action of the wheels 61.

Thus, it can be seen that in both the preferred embodiment and in the modification the axle structure is shifted longitudinally with respect to the body of the vehicle. This shifting of the axle is automatic and immediate during any change in the direction of movement of the vehicle. As such shifting takes place the spindle of the castering construction is immediately tilted angularly with the axle so that the vertical centerline and its intersecting point with the ground is changed in accordance with the conventional castering principle of operation. By tilting of the axle and the spindle in this manner it is unnecessary to shift the wheels themselves and the disadvantages above enumerated are thus not present. The castering structure is thus particularly adaptable to vehicles which must carry large loads and which must have sufficient versatility so that they may be manipulated in forward and rearward directions with ease. Thus the full advantages of a castering structure result without the disadvantages that are generally found in conventional designs.

The objects of the invention have been fully achieved and it must be understood that further changes and modifications may be made in the design without departing from the spirit of the invention as disclosed nor the scope thereof as defined in the appended claims.

What is claimed is:

1. In a vehicle having a body, a caster wheel construction comprising a transversely extending axle, a castering socket connected to said axle, said socket being normally positioned in an upright position, a spindle, said spindle including an upright portion journalled in said socket for pivotal movement about a vertical axis, a laterally extending stub axle connected to the upright portion, a wheel journalled on said stub axle, means for movably supporting said axle whereby said axle may be moved longitudinally with respect to said body, said means including a longitudinally extending track member on said body, bearing means on said axle engaging said track member in relative longitudinal sliding relation, adjusting means connected to said body and to said axle for pivoting said axle about a longitudinal axis to a first position wherein a vertical centerline through the vertical axis of the spindle intersects the ground line at a point spaced forwardly of the bearing point of the wheel with the ground during forward movement of the vehicle, whereby during rearward movement of said vehicle, said axle is moved longitudinally to a second position and said adjusting means pivots said axle about a longitudinal axis wherein a vertical centerline through the vertical axis of the spindle intersects the ground line at a point spaced rearwardly of the bearing point of the wheel with the ground.

2. In a vehicle having a body, a caster wheel construction connected to said body, said caster wheel construction comprising a transversely extending axle, a castering socket connected to said axle, said socket normally having its axial centerline positioned in a substantially vertical position, a spindle having a portion journalled in said socket, said spindle including a laterally extending stub axle, a wheel journalled on said stub axle, means connecting said axle to said body including a support connected to said body, a longitudinally extending track mounted on said support, a bearing structure on said axle, said bearing structure being in sliding engagement with said track whereby said axle may be moved longitudinally with respect to said body to a first position, adjusting means connected to said body and to said axle for tilting said axle and said socket wherein an axial centerline through said socket intersects the ground line at a point spaced forwardly of the bearing point of the wheel with the ground during forward movement of the vehicle, said axle being movable longitudinally to a second position, said adjusting means tilting said axle and said socket wherein an axial centerline through said socket intersects the ground line at a point spaced rearwardly of the bearing point of the wheel with the ground during rearward movement of the vehicle.

3. In a vehicle in accordance with claim 2, the bearing structure including rollers in sliding engagement with the track.

4. In a vehicle in accordance with claim 3, said adjusting means including a cam mounted on the body, and a cam arm on the axle engageable with the cam for tilting the axle during longitudinal movement of the axle with respect to said body.

5. In a vehicle having a body, a pair of laterally spaced axle supports mounted on said body, an axle extending transversely with respect to said body, a pair of castering wheel structures connected to laterally spaced end portions of said axle, each castering wheel structure including a socket normally disposed in an upright position and connected to said axle for tilting movement therewith, a castering spindle including a first journal portion engaging the socket for relative pivotal movement about a vertical axis, a second journal portion connected to said first journal portion and extending laterally with respect thereto, a caster wheel journalled on the second journal portion, means connecting said axle to said body including a longitudinally extending track supported on each axle support, a pair of laterally spaced bearing structures positioned below the tracks, each structure including a collar pivotally supported on said axle, first longitudinally spaced bearing rollers pivotally connected to said collar, said bearing rollers engaging the underneath side of the track in relative rolling relation, a bracket connected to the collar, second longitudinally spaced rollers connected to said bracket, said second rollers engaging the upper side of the track in relative rolling relation, stop means associated with said track for limiting the longitudinal movement of said axle, laterally spaced elements on said body for tilting said axle during longitudinal movement of said axle with respect to said body including, a cam positioned on said body, said cam having a cam surface extending angularly with respect to the direction of longitudinal movement of said axle, and a cam member connected to said axle for longitudinal movement therewith, said cam member being in engagement with said cam surface for tilting said axle about a horizontal axis to a first position during longitudinal movement wherein a vertical centerline through the first journal portion of the spindle intersects the ground at a point spaced forwardly of the bearing point of the wheel with the ground during forward movement of the vehicle, said cam member and said cam surface being engageable during longitudinal movement in an opposite direction to tilt said axle about a horizontal axis to a second position wherein a vertical centerline through the first journal portion of the spindle intersects the ground at a point spaced rearwardly of the bearing point of the wheel with the ground during rearward movement.

6. In a vehicle having a body, a pair of laterally spaced axle supports mounted on said body, an axle extending transversely with respect to said body, a pair of castering wheel structures connected to laterally spaced end portions of said axle, each castering wheel structure including a socket normally disposed in an upright position and connected to said axle for tilting movement therewith, a castering spindle including a first journal portion engaging the socket for relative pivotal movement about a vertical axis, a second journal portion connected to said first journal portion and extending laterally with respect thereto, a caster wheel journalled on the second journal portion, means connecting said axle to said body including a longitudinally extending track supported on each axle support, a pair of laterally spaced bearing structures, each structure including a collar pivotally supported on said axle, first longitudinally spaced bearing rollers pivotally connected to said collar, said bearing rollers engaging the underneath side of the track in relative rolling relation, a bracket connected to the collar, second longitudinally spaced rollers connected to said bracket, said second rollers engaging the upper side of the track in relative rolling relation, laterally spaced elements on said body for tilting said axle during longitudinal movement of said axle with respect to said body including, a cam positioned on said body, said cam having a cam surface extending angularly with respect to the direction of longitudinal movement of said axle, and a cam member connected to said axle for longitudinal movement therewith, said cam member being in engagement with said cam surface for tilting said axle about a horizontal axis to a first position during its longitudinal movement wherein a vertical centerline through the first journal portion of the spindle intersects at a point spaced forwardly of the bearing point of the wheel with the ground during forward movement of the vehicle, said cam member and said cam surface being engageable during longitudinal movement of the axle in an opposite direction to tilt said axle about a horizontal axis to a second position wherein a vertical centerline through the first journal portion of the spindle intersects the ground at a point spaced rearwardly of the bearing point of the wheel with the ground during rearward movement.

7. In a vehicle having a body, a pair of laterally spaced axle supports mounted on said body, an axle extending transversely with respect to said body, a pair of castering wheel structures connected to laterally spaced end portions of said axle, each castering wheel structure including a socket normally disposed in an upright position and connected to said axle for tilting movement therewith, a castering spindle including a first journal portion engaging the socket for relative pivotal movement about a vertical axis, a second journal portion connected to said first journal portion and extending laterally with respect thereto, a caster wheel journalled on the second journal portion, means connecting said axle to said body including a longitudinally extending track supported on each axle support, a pair of laterally spaced bearing structures, each structure including a collar pivotally supported on said axle, first longitudinally spaced bearing rollers pivotally connected to said collar, said bearing rollers engaging the underneath side of the track in relative rolling relation, laterally spaced elements on said body for tilting said axle during longitudinal movement of said axle with respect to said body including, a cam positioned on said body, said cam having a cam surface extending angularly with respect to the direction of longitudinal movement of said axle, and a cam member connected to said axle for longitudinal movement therewith, said cam member being in engagement with said cam surface for tilting said axle about a horizontal axis to a first position during longitudinal movement of the axle in one direction wherein a vertical centerline through the first journal portion of the spindle intersects at a point spaced forwardly of the bearing point of the wheel with the ground during forward movement of the vehicle, said cam member and said cam surface being movable to tilt said axle about a horizontal axis to a second position during longitudinal movement of the axle in an opposite direction wherein a vertical centerline through the first journal portion of the spindle intersects the ground at a point spaced rearwardly of the bearing point of the wheel with the ground during rearward movement.

8. In a vehicle having a body, a pair of laterally spaced axle supports mounted on said body, an axle extending transversely with respect to said body, a pair of castering wheel structures connected to laterally spaced end portions of said axle, each castering wheel structure including a socket normally disposed in an upright position and connected to said axle for tilting movement therewith, a castering spindle including a first journal portion engaging the socket for relative pivotal movement about a vertical axis, a second journal portion connected to said first journal portion and extending laterally with respect thereto, a caster wheel journalled on the second journal portion, means connecting said axle to said body including a longitudinally extending track supported on each axle support, a pair of laterally spaced bearing structures, each structure including a collar pivotally supported on said axle, first longitudinally spaced bearing rollers pivotally connected to said collar, said bearing rollers engaging the underneath side of the track in relative rolling relation, cam elements connected between said body and said axle for tilting said axle about a horizontal axis to a first position wherein a vertical centerline through the first journal portion of the spindle intersects at a point spaced forwardly of the bearing point of the wheel with the ground during forward movement of the vehicle, said cam elements being movable to tilt said axle about a horizontal axis to a second position wherein a vertical centerline through the first journal portion of the spindle intersects the ground at a point spaced rearwardly of the bearing point of the wheel with the ground during rearward movement.

9. In a vehicle having a body, a caster wheel construction connected to said body, said caster wheel construction comprising a transversely extending axle, a castering socket connected to said axle, said socket normally having its axial centerline positioned in a substantially vertical position, a spindle having a portion journalled on said socket, said spindle including a laterally extending stub axle, a wheel journalled on said stub axle, means connecting said axle to said body including a support connected to said body, a longitudinally extending track mounted on said support, a bearing structure on said axle, said bearing structure being in sliding engagement with said track whereby said axle may be moved longitudinally with respect to said body to a first position, cam means connected to the body and to said axle, said cam means being movable for tilting the axle about a horizontal axis during longitudinal movement to the first position whereby an axial centerline through said socket intersects the ground line at a point spaced forwardly of the bearing point of the wheel with the ground during forward movement of the vehicle said axle being movable longitudinally to a second position, said cam means being operable to tilt said axle in an opposite direction during longitudinal movement to the second position wherein an axial centerline through said socket intersects the ground line at a point spaced rearwardly of the bearing point of the wheel with the ground during rearward movement of the vehicle.

10. In a vehicle having a body, a caster wheel construction connected to said body comprising, a transversely extending axle, a castering socket connected to said axle, said socket normally having its axial centerline positioned in a substantially vertical position, a spindle having a first journal portion in pivotal engagement with said socket, said spindle having a second laterally extending journal portion, a ground wheel journalled on said second journal portion, means for supporting said axle on said body for relative longitudinal movement, said means including a support on said body, an arcuate track connected to said support, a first pair of longitudinally spaced rollers connected to said axle, said rollers engaging the underneath side of said track in rolling relation, a second pair of longitudinally spaced rollers connected to said axle, said second pair of rollers engaging the upper side of said arcuate track in relative rolling relation, and stop members longitudinally spaced for limiting the longitudinal movement of said rollers, said axle being movable during forward movement of the vehicle in a longitudinal direction to a first tilted position wherein an axial centerline through the socket intersects the ground line at a point spaced forwardly of the bearing point of the wheel with the ground, said axle being movable during rearward movement of the vehicle in a longitudinal direction to a second tilted position wherein an axial centerline through the socket intersects the ground line at a point spaced rearwardly of the bearing point of the wheel with the ground.

11. In a vehicle having a body, a caster wheel construction connected to said body comprising, a transversely extending axle, a castering socket connected to said axle, said socket normally having its axial centerline positioned in a substantially vertical position, a spindle having a first journal portion in pivotal engagement with said socket, said spindle having a second laterally extending journal portion, a ground wheel journalled on said second journal portion, means for supporting said axle on said body for relative longitudinal movement, said means including a support on said body, an arcuate track connected to said support, a pair of longitudinally spaced rollers connected to said axle said rollers engaging the said track in rolling relation, and stop members longitudinally spaced for limiting the longitudinal movement of said rollers, said axle being movable during forward movement of the vehicle in a longitudinal direction to a first tilted position wherein an axial centerline through the socket intersects the ground line at a point spaced forwardly of the bearing point of the wheel with the ground, said axle being movable during rearward movement of the vehicle in a longitudinal direction to a second tilted position wherein an axial centerline through the socket intersects the ground line at a point spaced rearwardly of the bearing point of the wheel with the ground.

12. In a vehicle having a body, a caster wheel construction connected to said body comprising, a transversely extending axle, a castering socket connected to said axle, said socket normally having its axial centerline positioned in a substantially vertical position, a spindle having a first journal portion in pivotal engagement with said socket, said spindle having a second laterally extending journal position, a ground wheel journalled on said second journal portion, means for supporting said axle on said body for relative longitudinal movement, said means including a support on said body, an arcuate track connected to said support, a pair of longitudinally spaced rollers connected to said axle, said rollers engaging the said track in rolling relation, said axle being movable during forward movement of the vehicle in a longitudinal direction to a first tilted portion wherein an axial centerline through the socket intersects the ground line at a point spaced forwardly of the bearing point of the wheel with the ground, said axle being movable during rearward movement of the vehicle in a longitudinal direction to a second tilted position wherein an axial centerline through the socket intersects the ground line at a point spaced rearwardly of the bearing point of the wheel with the ground.

13. In a vehicle having a body, a caster wheel construction connected to said body comprising, a transversely extending axle, a castering socket connected to said axle, said socket normally having its axial centerline positioned in a substantially vertical position, a spindle having a first journal portion in a pivotal engagement with said socket, said spindle having a second laterally extending journal portion, a ground wheel journalled on said second journal portion, means for supporting said axle on said body for relative longitudinal movement, said means including a support on said body, an arcuate track connected to said support, bearing means on the axle engaging said arcuate track in bearing relation, said axle being movable during forward movement of the vehicle in a longitudinal direction to a first tilted position wherein an axial centerline through the socket intersects the ground line at a point spaced forwardly of the bearing point of the wheel with the ground, said axle being movable during rearward movement of the vehicle in a longitudinal direction to a second tilted position wherein an axial centerline through the socket intersects the ground line at a point spaced rearwardly of the bearing point of the wheel with the ground.

References Cited in the file of this patent

UNITED STATES PATENTS

| Number | Name | Date |
| --- | --- | --- |
| 706,209 | Sumner | Aug. 5, 1902 |
| 1,524,136 | Kapferer et al. | Jan. 27, 1925 |
| 2,345,945 | Miner | Apr. 4, 1944 |
| 2,377,641 | Miner | June 5, 1945 |
| 2,560,562 | Ferwerda | July 17, 1951 |